United States Patent [19]

Gemma et al.

[11] Patent Number: 5,039,223

[45] Date of Patent: Aug. 13, 1991

[54] INTERFEROMETER FOR MEASURING ASPHERICAL FORM WITH THE UTILIZATION OF COMPUTER GENERATED HOLOGRAM

[75] Inventors: Takashi Gemma; Takuji Satoh, both of Tokyo; Takashi Yokokura, Hino, all of Japan

[73] Assignee: Kabushiki Kaisha TOPCON, Japan

[21] Appl. No.: 377,429

[22] Filed: Jul. 10, 1989

[30] Foreign Application Priority Data

Jul. 13, 1988 [JP] Japan .................. 63-173998

[51] Int. Cl.⁵ .................. G01B 9/02
[52] U.S. Cl. .................. 356/348; 356/347; 356/360
[58] Field of Search .................. 356/347, 348, 360

[56] References Cited

U.S. PATENT DOCUMENTS 4,696,572 9/1987 Ono .................. 356/348
4,758,089 7/1988 Yokokura et al. .................. 356/348

Primary Examiner—Samuel Turner
Attorney, Agent, or Firm—Mason, Fenwick & Lawrence

[57] ABSTRACT

An interferometer for measuring an aspherical shape uses a computer generated hologram. The interferometer comprises a hologram disposed at each of positions conjugate with plural types of aspherical surfaces to be examined and filed lens means disposed between a position conjugate with a convex aspherical surfaces and another position with a concave aspherical surface. The interferometer can measure plural types of aspherical surfaces to be examined without need of changing the position of the interferometer for each of the aspherical surfaces to be examined, even if the number of different surfaces to be examined increases.

6 Claims, 4 Drawing Sheets

INTERFEROMETER FOR MEASURING ASPHERICAL FORM WITH THE UTILIZATION OF COMPUTER GENERATED HOLOGRAM

BACKGROUND OF THE INVENTION

1. Field of the Invention

The present invention relates to an interferometer for measuring an aspherical shape by the use of computer generated hologram.

2. Description of the Prior Art

In the measurement of aspherical shape using the computer generated hologram, it is customary that an aspherical surface to be measured is disposed at such a position as the wave face of aspherical wave entering thereonto coincides with the spherical surface approximating to the aspherical surface. In such an arrangement, the spatial frequency of the hologram becomes minimum. Consequently, the preparation of hologram can be easily made without requiring an increased accuracy with respect to the position at which the hologram is formed.

Generally, when an aspherical surface to be examined is determined, only a single position conjugate with that aspherical surface can be determined. In order to reduce the error of the computer generated hologram with respect to its position as small as possible, which error highly affects the accuracy of measurement relating to the aspherical surface, the position of the set hologram must be varied for the conjugate position which is changed in each time when the aspherical surfaces to be measured is changed from one to another. However, this is very difficult to be done actually. In the past, an exclusive interferometer was assembled for each change in the aspherical surface to be measured while the hologram remained set as it is.

Such a measuring process is very inefficient as the kinds of aspherical surfaces to be checked increase. It is thus desirable to use a single interferometer which can measure plural kinds of aspherical surfaces. In such a case, a hologram holder for holding the computer generated hologram as a primary standard is maintained stationary to secure the severe accuracy relating to the position of the hologram. In such an arrangement, it will not be impossible to perform the measurement although the conjugate relationship between the aspherical surface to be measured and the hologram will be disturbed.

However, such an arrangement raises various problems as listed below.

First, as seen from the flow chart in FIG. 3, the preparation of computer generated hologram requires to calculate an approximation from a polynominal for the wave surface of an object as one step in the process. The object wave surface on a hologram which is a wave surface reflected by an aspherical surface to be measured will have a strain created due to the non-conjugation in the aforementioned arrangement. Therefore, the accuracy of the functional approximation in the object wave surface, which is required to prepare the computer generated hologram will be reduced. As a result, the accuracy of measurement for the aspherical shape will also be decreased.

Although the computer generated hologram includes a pattern drawn based on interference fringes corresponding to a different between an aspherical surface to be measured and an ideal aspherical surface, such a pattern represents the components of the aspherical surface included in the object wave surface. If the term "spatial frequency" is now defined as one corresponding to the spacing between the interference fringes which is formed in the computer generated hologram by the object and reference lights, the spatial frequency in the computer generated hologram will be caused to have an upper limit depending on the conditions in the preparation of hologram. Accordingly, the measurable amount of the aspherical components will also be caused to have its upper limit.

The distortion on the wave surface, which is created due to the fact that the computer generated hologram is not in the conjugate position, is considered to be the actually aspherical component in the object wave surface on the hologram. Therefore, the measurable amount of aspherical surface will be reduced correspondingly to the distortion in the wave surface, as compared with such an arrangement in which the hologram is in its conjugate position. This measurable amount of aspherical surface greatly varies depending on whether the computer generated hologram is in conjugation with convex or concave surface to be measured.

If a convex surface to be examined rather than a concave surface to be examined is to be measured by positioning the hologram at a location conjugate with the concave surface, therefore, the measurable amount of aspherical surface in the convex surface will be highly limited.

If the computer generated hologram is not disposed at a position conjugate with a surface to be examined, a pattern of interference fringes created from such an arrangement will have a distortion. It thus becomes difficult that each point in the pattern of fringes coincides with the corresponding point on the surface to be examined.

FIG. 4 shows interference fringes obtained by the conventional interferometer which has adopted such an arrangement that the computer generated hologram is not fixed in a position conjugate with a surface to be examined. As seen from FIG. 4, the surface to be examined is in the shape of an aspherical surface which is cut into the rectangular configuration. Due to this arrangement in which the hologram cannot be disposed at the position conjugate with the surface to be examined, it is recognized that the resulting pattern of interference fringes is distorted into a pin-cushion configuration.

Japanese Patent Disclosure No. 63-61925 describes a method and apparatus for analyzing interference fringes in a holographic interferometer which can determine a difference between the actual form and the ideal form in an object to be examined even if there is any error with respect to the arrangement of the object to be examined or the primary hologram standard. In the Japanese Patent Disclosure, only seven coefficients are required to analyze the interference fringes if the hologram is in conjugation with the surface to be examined. On the contrary, thirteen coefficients must be determined if the hologram is not in conjugation with the surface to be examined. Time required to determine such thirteen coefficients becomes huge.

SUMMARY OF THE INVENTION

It is therefore an object of the present invention to provide an interferometer for measuring the shape of aspherical surface by the use of computer generated hologram, which can measure plural types of aspherical surfaces to be examined without need of changing the position of the interferometer for each of the aspherical surfaces to be examined, even if the number of different surfaces to be examined increases.

Another important object of the present invention is to provide an interferometer for measuring the shape of aspherical surface by the use of computer generated hologram, which will not have disadvantages from the aforementioned problems in the prior art even if the primary hologram standard is not disposed at a position conjugate with an aspherical surface to be examined.

A further object of the present invention is to reduce the size of an interferometer for measuring the form of aspherical surface by the use of computer generated hologram by decreasing the distance between each adjacent conjugate positions for a plurality of aspherical surfaces to be measured.

To this end, the present invention provides an interferometer for measuring the form of aspherical surface by the use of computer generated hologram, in which a hologram is disposed at each of conjugate positions for plural types of aspherical surfaces to be examined and which comprises a field lens disposed between the conjugate positions for convex and concave aspherical surfaces.

DETAILED DESCRIPTION OF THE PREFERRED EMBODIMENT

Figure 1:
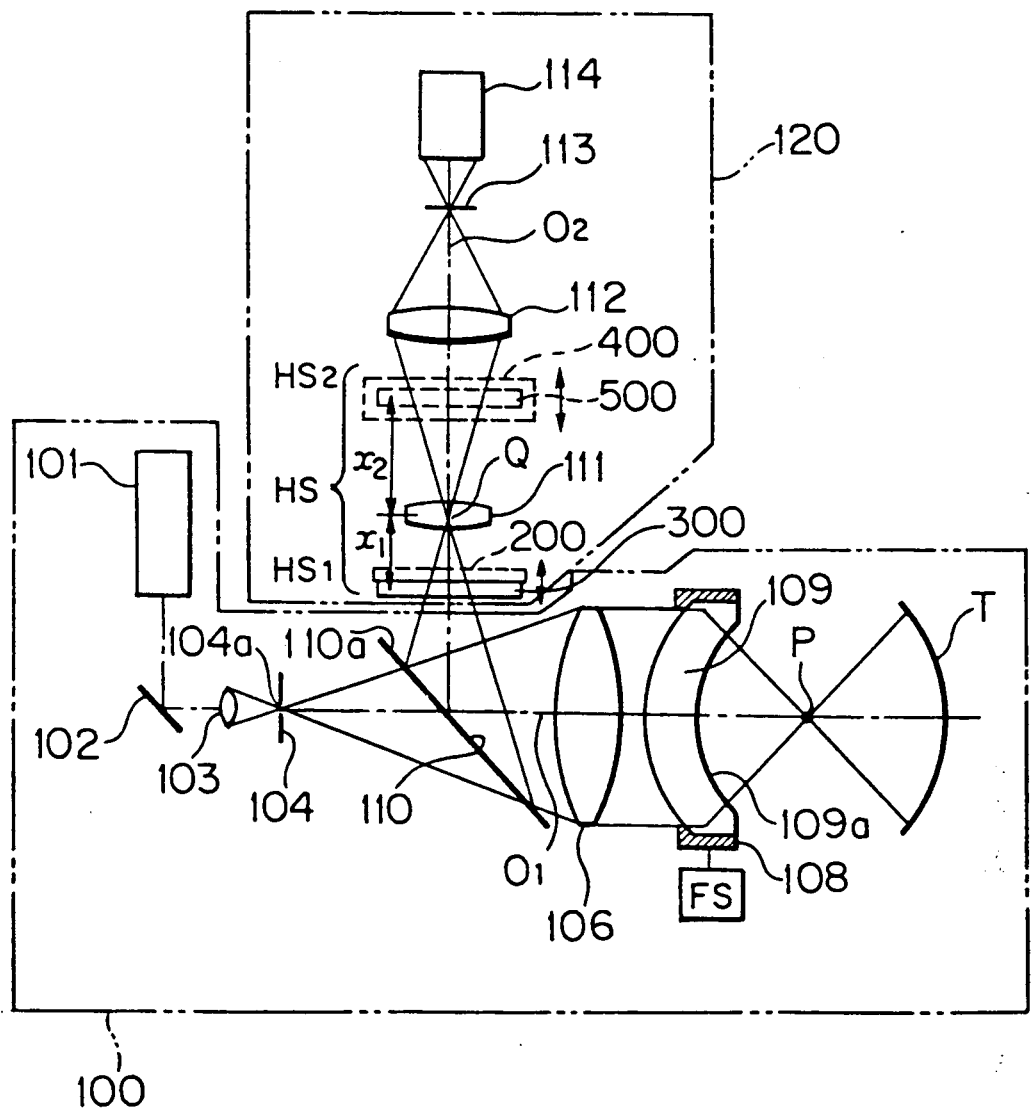
FIG. 1 is a diagram of the optical layout of an interferometer for measuring the shape of aspherical surface by the use of computer generated hologram, which is constructed in accordance with the present invention.

Referring now to FIG. 1, a light beam from a laser 101 which is a source of light is bent along the optical path by a mirror 102 and then condensed by a condenser lens 103. A pinhole plate 104 having a pinhole 104a is disposed adjacent to the condensed point. The light beam then passes through the pinhole 104a to form a divergent light beam emitted from the pinhole 104a as if it is the secondary source of light.

A collimator lens 106 is disposed with its focal point being positioned at the pinhole 104a. The light beam emitted from the pinhole 104a as if it is the secondary light source is converted into a beam of parallel rays through the collimator lens 106.

If an object to be examined is the shape of a concave object such as aspherical concave mirror, a reference lens 109 is mounted in a lens barrel 108. The reference lens 109 serves to converge the parallel rays from the collimator lens 106 on a point to form a convergent light beam. Thereafter, the convergent light beam is again diverged to form a divergent light beam which in turn enters the object to be examined, for example, as shown in the form of an aspherical concave mirror T.

The object beam reflected by the object to be examined T and the reference beam reflected by the final face 109a of the reference lens 109 enter a beam splitter 110 having a half-mirror face 110a which is angled relative to the optical axis $O_1$ between the pinhole reticle plate 104 and the collimator lens 106.

All the laser 101, mirror 102, condenser lens 103, pinhole reticle plate 104, beam splitter 110, collimator lens 106, reference lens 109 and the object to be examined T are placed on a common base 100.

Both the object and reference beams entering the beam splitter 110 are reflected by the half-mirror face 110a to a primary hologram standard 300 which is supported on a primary hologram standard holder 200. The holder 200 is arranged such that if the object to be examined T is in the form a concave aspherical mirror, the primary hologram standard 300 is located at a position conjugate with such a mirror.

After passing through the primary hologram standard 300, the beam is converged into a point Q to form a composite image from the object and reference rays. At this imaging point Q is disposed a field lens 111. After passing through the field lens 111, the beam is imaged on a spatial filter 113 through an imaging lens 112. The spatial filter 113 is adapted to selectively pick out one light component diffracted by the primary hologram standard 300 and the other light component not diffracted by the primary hologram standard 300 from the incident rays of the reference and object lights.

More particularly, the spatial filter 113 serves to exclusively pick out, for example, zero-order difference rays of the reference beam from the final face 109a of the reference lens 109 which are not diffracted by the primary hologram standard 300 and primary diffracted rays of the object beam from the object to be examined T which are diffracted by the primary hologram standard 300 and to block higher-order diffracted rays other than the aforementioned diffracted rays.

If the object to be examined T is in the form of a convex object such as aspherical convex mirror, it is disposed on the optical axis $O_1$ such that the center of curvature on its convex face coincides with the focal point of the reference lens 109. In such a case, there is provided a second primary hologram standard 500 and a second primary hologram standard holder 400 which is located such that the second primary hologram standard 500 is at a position conjugate with the convex aspherical mirror. The second primary hologram standard 400 and its holder 500 are interposed between the field lens 111 and the imaging lens 112, as shown by broken lines in FIG. 1.

The object and reference rays selected by the spatial filter 113 are directed to the screen of a TV camera 114 through an image pick-up lens (not shown) wherein they form an interference pattern. The image picked up by the TV camera 114 is then directed to a TV monitor (not shown) and an interference fringe analyzing system (not shown) which includes a computer.

An observing optical system 120 for observing the interference fringes is defined by the first primary hologram holder 200, field lens 111, second primary hologram holder 400, imaging lens 112, spatial filter 113 and TV camera 114.

The primary hologram standard holders 200 and 400 are movable along the optical axis $O_1$ while maintaining their position perpendicular to the optical axis $O_2$ in the alignment optical system 120. In other words, if the object to be examined T is in the form of a concave object such as aspherical concave mirror, the first primary hologram standard holder 200 will be moved along the optical axis $O_2$ to such a position that the first primary hologram standard 300 is at a position conjugate with the concave face of the aspherical concave mirror, in connection with the adjusting operation which is effected to align the center of curvature on the concave face of the concave mirror with the focal point of the reference lens 109. On the contrary, if the object to be examined T is in the form of a convex object such as aspherical convex mirror, the second primary hologram standard holder 400 will be moved along the optical axis $O_2$ to such a position that the second primary hologram standard 500 is at a position conjugate with the convex face of the aspherical convex mirror, in connection with the adjusting operation which is effected to align the center of curvature on the convex face of the convex mirror with the focal point of the reference lens 109.

The first and second holders 200 and 400 are part of a mechanism HS for driving the primary hologram standard, which is located on the common base 100. The common base 100 also supports a fringe scanning mechanism FS for analyzing the interference fringes with an increased accuracy. The driving mechanism HS can selectively move the first or second holder 200 or 400 depending on the configuration of the aspherical surfaces to be examined.

In any event, the selected one of the primary hologram standards supported in the respective holders can be positioned at a location conjugate with the corresponding aspherical surface to be examined. The position of the hologram in the direction of optical axis is determined by moving the corresponding holder to a predetermined position. The position of the hologram in the plane perpendicular to the optical axis can be accomplished by the use of an exclusive alignment system. On the contrary, the object to be examined is positioned at a position conjugate with that hologram as a standard while observing the TV monitor disposed as described hereinbefore. Information required for adjustment is provided by the interference fringe analyzing system (not shown) as aforementioned.

In such an arrangement as described in connection with FIG. 1, the field lens 111 is interposed between the beam splitter 110 and the imaging lens 112; the first primary hologram standard 300 is located in the space between the field lens 111 and the beam splitter 110; the second primary hologram standard 500 is positioned in the space between the field lens 111 and the imaging lens 112; and the first and second primary hologram standard 300, 500 are selectively movable within the respective spaces depending on the configuration of the aspherical surfaces to be examined. As a result, the range of movement required for the two primary hologram standards can be reduced, resulting in decrease of the size of the entire system.

Figure 2A:
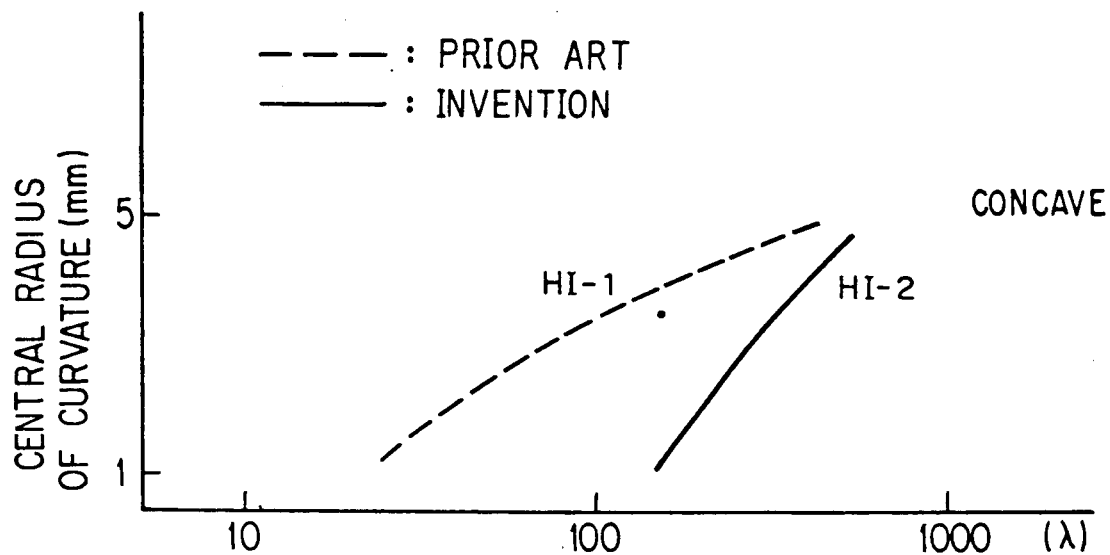
FIG. 2 is a graph showing curves which represent the measurable amount of aspherical surface for each of the central radiuses of curvature in aspherical surfaces to be examined.
Figure 2B:
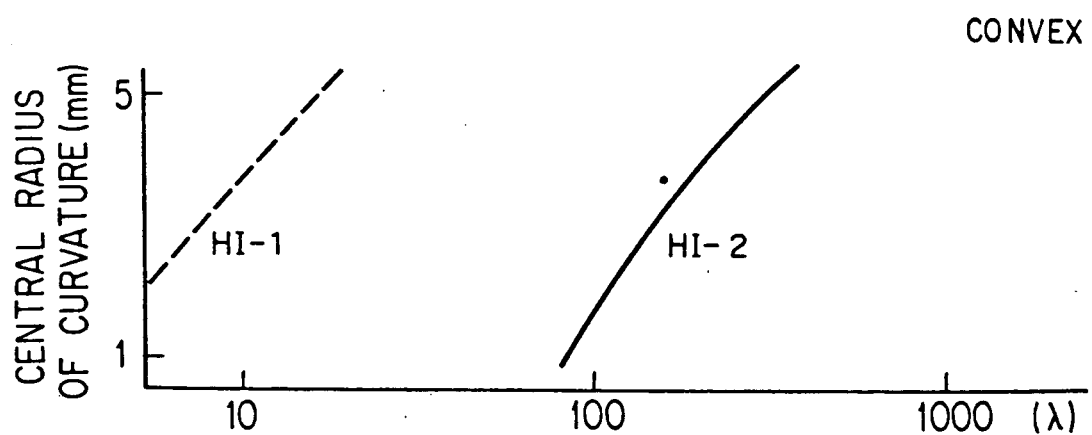
Figure 3:
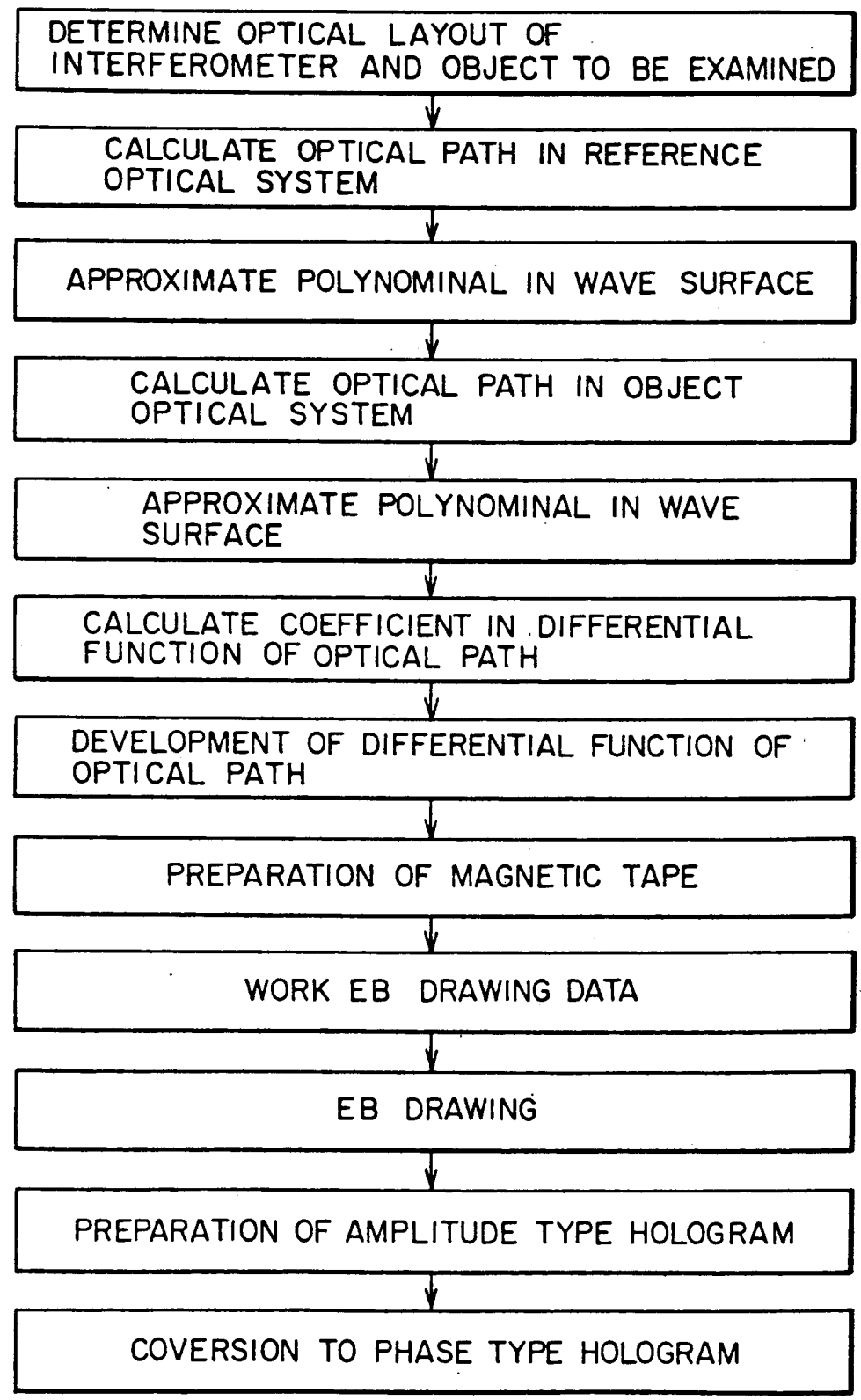
FIG. 3 is a flow chart illustrating steps for preparing a computer generated hologram.
Figure 4:
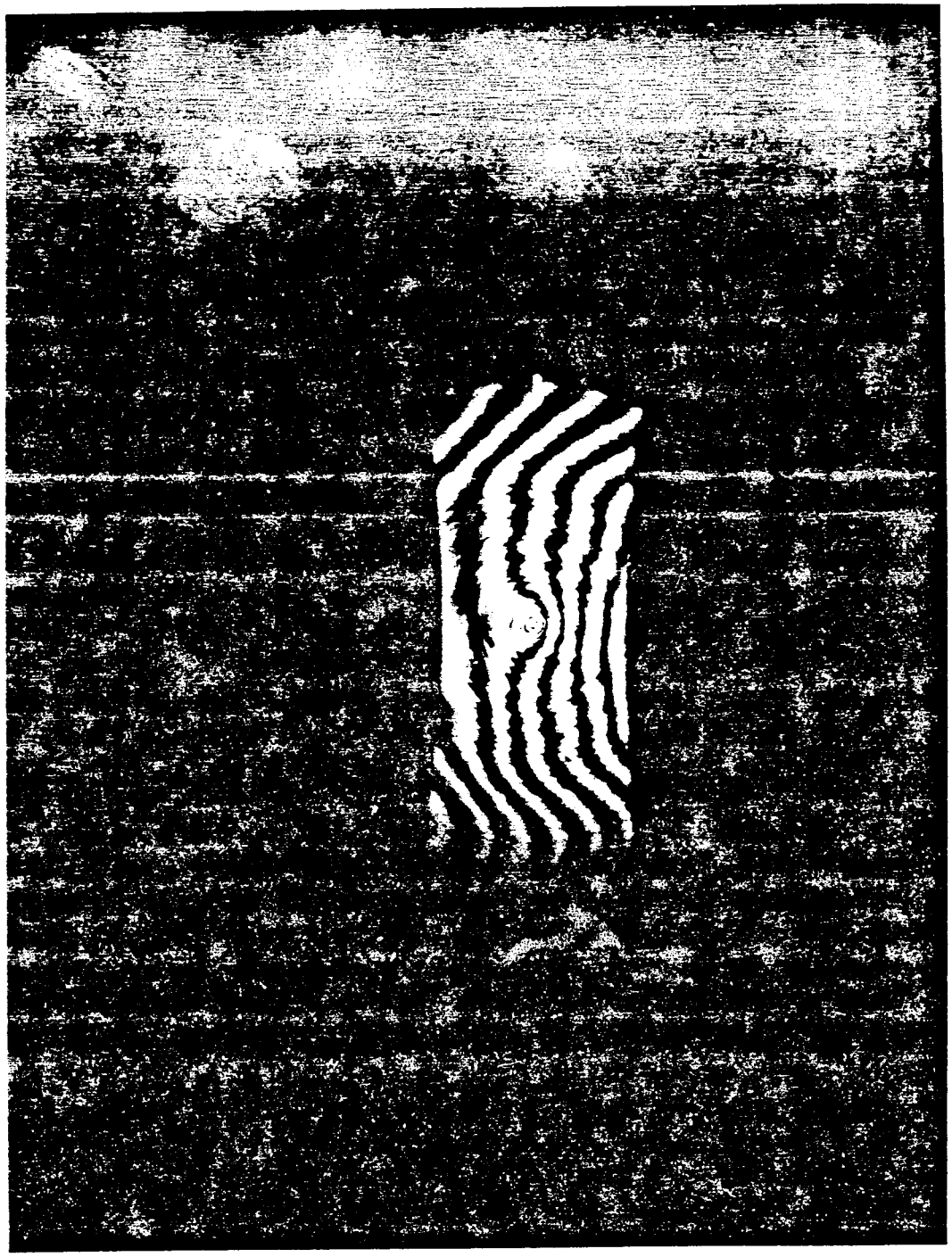
FIG. 4 illustrates a pattern of interference fringes obtained by the use of the conventional interferometer which has adopted such an arrangement that the primary standard of the computer generated hologram is stationarily set at a position conjugate with an object to be examined.

FIG. 2 is a graph in which the central radiuses of curvature (unit: millimeter) in various aspherical surfaces to be examined are plotted on the vertical line while the measurable amount of aspherical surface (unit: Wavelength $\lambda$ of the measured beam) for the respective central radiuses of curvature are plotted on the transverse line. The upper graph section (a) in FIG. 2 represents values obtained from the concave aspherical surfaces to be examined while the lower graph section (b) in the same figure represents values obtained from the convex aspherical surfaces to be examined. In both the graph sections (a) and (b), solid-line curves show results calculated by the HI-2 type system constructed according to the principle of the present invention while broken-line curves illustrate results calculated by the HI-1 type system constructed according to the prior art.

These calculated results were obtained when it is assumed that any deviation in the aspherical surface from the spherical surface is proportional to the fourth power of the central radius of curvature. Therefore, these values are slightly different from that of the actual aspherical surfaces to be examined. The surfaces to be examined were selected from aspherical concave and convex lenses used as CD objective lenses The reference lens was an F:0.8 lens and the amount of aspherical surface measured by the use of the HI-2 type interferometer are illustrated by black spots in the graph sections (a) and (b) of FIG. 2.

As is apparent from FIG. 2, the prior art HI-1 type interferometer decreases the measurable amount of aspherical surface if the convex surfaces to be examined are measured by the use of a hologram supported by its holder fixed at the corresponding position since the HI-1 type system has such a structure that its hologram holder is fixedly positioned at a location conjugate with the corresponding concave surface to be examined.

As also seen from the black spots in FIG. 2, the CD objective lens can be used in the HI-2 type system of the present invention while the prior art HI-1 type system cannot use such CD objective lens.

Although the present invention has been described in detail as to one preferred embodiment, various changes and modifications can be made without departing from the spirit and scope of the invention as defined in the appended claim. For example, the measurement optical system may be moved such that the primary hologram standard is stationary while the surface to be examined is at a position conjugate with the primary hologram standard. In other words, an arrangement may be adopted in the present invention in which the spacing between the reference lens 109 and the collimator lens 106 can be varied.

The present invention thus provides the following advantages:

First of all, the accuracy in the preparation of hologram or in the approximation of object wave surface can be improved. For example, if the surface to be examined is a CD objective lens and power series are adopted as the functional approximation such that its order is set up to eighteen degrees, the approximate accuracy is 0.053 $\lambda$ (where $\lambda$ is the wavelength of the measured beam) for non-conjugation and 0.00015 $\lambda$ for conjugation.

Second, the measurable amount of aspherical surface may be increased.

Third, a pattern of interference fringes having no strain may be formed since an aspherical surface to be examined can be disposed at a position conjugate with the corresponding hologram. Thus, there can be easily attained a rectilinear relationship between any point in the pattern and any point on the surface to be examined.

Fourth, the conjugate relationship between an aspherical surface to be examined and the corresponding hologram which is one of the essential components of the present invention coincides with the conditions used in Japanese Patent Disclosure No.63-61925 assigned to the applicant and entitled "METHOD FOR ANALYZING INTERFERENCE FRINGES IN A HOLOGRAPHIC INTERFEROMETER" which can determine any difference in shape from the ideal shape of an object to be examined with less calculation even if there is any error in the arrangement of primary hologram standard. If the hologram is not at a position conjugate with the surface to be examined, therefore, thirteen coefficients are required to analyze the interference fringes, resulting in huge increase of time required for calculation. If the hologram is at a position conjugate with the surface to be examined as in the present invention, however, only seven coefficients are required. As a result, time required to analyze the interference fringes can be greatly reduced according to the principle of the present invention.

Finally, the range of conjugate position relative to the aspherical convex surface can be reduced by disposing the field lens between a position conjugate with the aspherical convex surface and another position conjugate with the aspherical concave surface. For example, if the reference lens is in the form of an F:O.8 lens and the central radiuses of curvature for aspherical surfaces to be examined are ranged between 1.3 millimeters and 4.1 millimeters, the conjugate positions are respectively set at:

$X_2 = 150$–$800$ mm without the field lens; and
$X_2 = 140$–$500$ mm with the field lens.

With the field lens 111 inserted therein, the range of movement in the conjugate position, that is, the primary hologram standard could be decreased 290 mm.

What is claimed is:

1. An interferometer for measuring an aspherical form by using a computer generated hologram, comprising:
   a laser light source;
   a first condenser lens system for generating from the laser light source a second light source;
   a second condenser lens system having a reference surface which partially reflects a portion of a light beam from the second light source and transmits the remainder of the light beam to a center of the reference surface;
   a beam splitter disposed at an oblique angle between the second light source and the second condenser lens system;
   a field lens located in a reflection axis of the beam splitter, and being conjugate to the second light source with respect to the second condenser lens system; and
   a computer generated hologram located at a position conjugate to the reference surface with respect to the second condenser lens system;
   wherein a surface to be measured may be positioned in front of the second condenser lens system for reflecting the light beam transmitted by the reference surface.

2. The interferometer of claim 1, further comprising:
   a movable holder located along the reflection axis of the beam splitter, on which the computer generated hologram is mounted so that the position of the hologram is adjusted to be conjugate to the reference surface with respect to the second condenser lens system.

3. An interferometer for measuring an aspherical form by using a computer generated hologram, comprising:
   a laser light source;
   a first condenser lens system for generating from the laser light source a second light source;
   a second condenser lens system having a reference surface which partially reflects a portion of a light beam from the second light source and transmits the remainder of the light beam to a center of the reference surface;
   a beam splitter disposed at an oblique angle between the second light source and the second condenser lens system;
   a field lens located in a reflection axis of the beam splitter, and being conjugate to the second light source with respect to the second condenser lens system; and
   a computer generated hologram located at a position conjugate to the reference surface with respect to the second condenser lens system;
   wherein a concave surface to be measured is positioned in front of the second condenser lens system past the center of the reference surface in the direction of light transmission from the reference surface, for reflecting the light beam transmitted by the reference surface.

4. The interferometer of claim 3, further comprising:
   a movable holder located along the reflection axis of the beam splitter, on which the computer generated hologram is mounted so that the position of the hologram is adjusted to be conjugate to the reference surface with respect to the second condenser lens system.

5. An interferometer for measuring an aspherical form by using a computer generated hologram, comprising:
   a laser light source;
   a first condenser lens system for generating from the laser light source a second light source;
   a second condenser lens system having a reference surface which partially reflects a portion of a light beam from the second light source and transmits the remainder of the light beam to a center of the reference surface;
   a beam splitter disposed at an oblique angle between the second light source and the second condenser lens system;
   a field lens located in a reflection axis of the beam splitter, and being conjugate to the second light source with respect to the second condenser lens system; and
   a computer generated hologram located at a position conjugate to the reference surface with respect to the second condenser lens system;
   wherein a convex surface to be measured is positioned in front of the second condenser lens system nearer than the center of the reference surface in the direction of light transmission from the reference surface, for reflecting the light beam transmitted by the reference surface.

6. The interferometer of claim 5, further comprising:
   a movable holder located along the reflection axis of the beam splitter, on which the computer generated hologram is mounted so that the position of the hologram is adjusted to be conjugate to the reference surface with respect to the second condenser lens system.

* * * * *